United States Patent
Iida et al.

(10) Patent No.: US 9,380,649 B2
(45) Date of Patent: Jun. 28, 2016

(54) JACKET HEATER AND METHOD FOR ATTACHING SAME

(75) Inventors: Kenji Iida, Tokyo (JP); Daisaku Seki, Tokyo (JP); Akira Sasaki, Tokyo (JP); Yoshiyuki Motoyoshi, Tokyo (JP); Mitsushi Wadasako, Tokyo (JP); Keiichi Fukuda, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 292 days.

(21) Appl. No.: 13/640,256

(22) PCT Filed: Apr. 6, 2011

(86) PCT No.: PCT/JP2011/058725
§ 371 (c)(1),
(2), (4) Date: Nov. 16, 2012

(87) PCT Pub. No.: WO2011/126051
PCT Pub. Date: Oct. 13, 2011

(65) Prior Publication Data
US 2013/0062338 A1    Mar. 14, 2013

(30) Foreign Application Priority Data
Apr. 6, 2010 (JP) .................. 2010-088006

(51) Int. Cl.
H05B 3/40 (2006.01)
H05B 3/48 (2006.01)
H05B 3/12 (2006.01)
F16L 53/00 (2006.01)
H05B 3/02 (2006.01)
H05B 3/34 (2006.01)
H05B 3/56 (2006.01)
H05B 3/58 (2006.01)

(52) U.S. Cl.
CPC ............... *H05B 3/12* (2013.01); *F16L 53/008* (2013.01); *H05B 3/02* (2013.01); *H05B 3/34* (2013.01); *H05B 3/56* (2013.01); *H05B 3/58* (2013.01); *Y10T 29/49002* (2015.01)

(58) Field of Classification Search
None
See application file for complete search history.

(56) References Cited

U.S. PATENT DOCUMENTS

| 2,485,852 | A | * | 10/1949 | Tebo | 392/459 |
| 2,889,445 | A | * | 6/1959 | Wolf | 392/435 |
| 3,614,967 | A | * | 10/1971 | Royston | F16L 59/023 138/141 |
| 4,253,012 | A | * | 2/1981 | Hughes | 219/458.1 |

(Continued)

FOREIGN PATENT DOCUMENTS

| JP | 1-89494 | 6/1989 | |
| JP | 05234666 A | * 9/1993 | ............... H05B 3/20 |

(Continued)

OTHER PUBLICATIONS

Official Action and partial English translation in JP 2012-509687 dated Dec. 3, 2013.

(Continued)

*Primary Examiner* — Joseph M Pelham
(74) *Attorney, Agent, or Firm* — Nixon & Vanderhye P.C.

(57) ABSTRACT

The present invention relates to a jacket heater having a heating element built therein, the jacket heater containing: the heating element having a watt density of 0.15 W/cm² or more, a metal foil disposed adjacently to the heating element, and a surrounding body which surrounds the heating element and the metal foil.

16 Claims, 3 Drawing Sheets

(56) References Cited

U.S. PATENT DOCUMENTS

| | | | |
|---|---|---|---|
| 5,051,561 A * | 9/1991 | McWilliams et al. | 219/461.1 |
| 6,111,234 A * | 8/2000 | Batliwalla et al. | 219/549 |
| 6,222,160 B1 * | 4/2001 | Remke | A45C 11/20 219/387 |
| 6,294,770 B1 * | 9/2001 | Hasegawa et al. | 219/544 |
| 2006/0199135 A1 * | 9/2006 | Mashima | 432/214 |
| 2009/0200290 A1 * | 8/2009 | Cardinal et al. | 219/488 |
| 2009/0321416 A1 * | 12/2009 | Sarigiannidis et al. | 219/535 |

FOREIGN PATENT DOCUMENTS

| | | |
|---|---|---|
| JP | 11-16669 | 1/1999 |
| JP | 11/016669 | 1/1999 |
| JP | 2002-295783 | 10/2002 |

OTHER PUBLICATIONS

International Search Report for PCT/JP2011/058725, mailed Jul. 12, 2011.

Microfilm of the Specification and Drawings annexed to the request of Japanese Utility Model Application No. 185331/1987 (Laid-open No. 89494/1989), (Jun. 13, 1989), 2 pages.

Office Action and English translation in CN 201180017804.7 issued Apr. 22, 2014.

Official Action and English language translation in KR 10-2012-7025951 dispatched Mar. 21, 2014.

* cited by examiner

JACKET HEATER AND METHOD FOR ATTACHING SAME

This application is the U.S. national phase of International Application No. PCT/JP2011/058725, filed 6 Apr. 2011, which designated the U.S. and claims priority to Japan Application No. 2010-088006, filed 6 Apr. 2010, the entire contents of each of which are hereby incorporated by reference.

TECHNICAL FIELD

The present invention relates to a jacket heater to be mounted on an object to be heated, e.g., piping, and a method for mounting the jacket heater.

BACKGROUND ART

In order to thermally insulate or heat objects to be heated, such as various apparatuses, equipment, and piping connected thereto, the pipes have conventionally been surrounded with jacket heaters having flexibility. Also in the case of thermally insulating or heating curved surfaces, e.g., the lateral surfaces of apparatuses, the same jacket heaters are mounted. Incidentally, such jacket heaters are also called mantle heaters.

Known as such a jacket heater is the mantle heater 10 shown in FIG. 5. The present applicant proposed, in patent document 1, a mantle heater 10 having a multilayer configuration in which a heating element 300 made of an inorganic-fiber sheet 303 and a heating wire (not shown) attached thereto and a thermal insulator 400 are superposed with each other and placed between an inner-layer material 100 formed of a fluororesin sheet and an outer-layer material 200. The heating wire is an electric heater wire, and power lines 306 which extend to the outside of the inner-layer material 100 and outer-layer material 200 have been connected to the electric heater wire. A receptacle outlet 307 is connected to an external power source (not shown) to feed electric power. When this mantle heater 10 is mounted on a straight pipe 20, the two peripheral edge parts 103 and 104 extending in the longitudinal direction are put together in a butt arrangement and are connected to each other by means of a hook-and-loop fastener 105 and 106 disposed on the edge surfaces.

Such a mantle heater 10 has flexibility and generates little dust, and hence has advantages in, for example, that the heater can be used in clean rooms or the like.

CITATION LIST

Patent Document

Patent Document 1: JP-A-2002-295783

SUMMARY OF THE INVENTION

Technical Problem

In the mantle heater 10 according to patent document 1, the inner-layer material 100 is made of a fluororesin and, hence, has a melting point which is slightly higher than 300° C. at the most. Consequently, there is a possibility that when the surface temperature of the object to be heated is set at a high temperature exceeding 250° C., the inner-layer material may deteriorate thermally. Since it is expected that requirement of heating temperatures will increase in future, it is necessary to increase the heating capacity of the heating element.

Although it can be considered that the thickness of the inner-layer material 100 is increased in accordance with the increased heating capacity of the heating element and thereby enhancing durability, this modification impairs the flexibility and results in an increase in cost.

Further, in a mantle heater (jacket heater), voltage application to the heating element is controlled using a thermostat, thermocouple, or resistance temperature detector in order to keep the pipe or the like at a given temperature. However, when, for example, the heating element has an insufficient heating capacity, there is a possibility that the pipe or the like might not be heated to the given temperature or heating to the given temperature might require much time. Although a reduction in heating time may be attained by using a heating element having a high heating capacity, this arouses the problems described above.

Accordingly, an object of the present invention is to provide a jacket heater in which, even when a heating element having a high heating capacity is used, the surrounding body including an inner-layer material and an outer-layer material (in particular, the inner-layer material) can be prevented from deteriorating thermally.

Means for Solving the Problem

In order to solve the above problem, the present invention provide the following jacket heater.

(1) A jacket heater having a heating element built therein, the jacket heater containing:

the heating element having a watt density of 0.15 W/cm$^2$ or more, a metal foil disposed adjacently to the heating element, and a surrounding body which surrounds the heating element and the metal foil.

(2) The jacket heater according to the above (1), in which the surrounding body is a sheet made of a fluororesin or a cloth made of inorganic fibers and having been subjected to coating treatment with a fluororesin.

(3) The jacket heater according to the above (1) or (2), in which an insulating member having electrical insulating properties has been interposed between the heating element and the metal foil.

(4) The jacket heater according to any one of the above (1) to (3), in which a thermal insulator has been placed on the side of the heating element opposite to the side where the metal foil has been disposed.

(5) The jacket heater according to any one of the above (1) to (4), in which the heating element contains an electric heating wire.

(6) The jacket heater according to any one of the above (1) to (5), which is mounted on an object to be heated, so that the metal-foil-side surface of the surrounding body comes into contact with the object.

(7) A method for mounting the jacket heater of any one of the above (1) to (6) on an object to be heated, in which the jacket heater is mounted so that the metal-foil-side surface of the surrounding body comes into contact with the object.

Advantageous Effect of the Invention

According to the jacket heater of the present invention, since a metal foil has been interposed, the thermal deterioration of the surrounding body (in particular, the inner-layer material) can be inhibited even when a heating element having a heating capacity as high as, for example, 0.15 W/cm$^2$ or more is used. Furthermore, since the heat transferred from the heater is evenly diffused by the action of the metal foil, heating can be done areally and evenly, resulting in an increase in heating efficiency. Moreover, since an increase in watt density is possible, not only a heater can be designed so as to have a reduced heater-wire length but also the heater wire can be disposed with an increased pitch to attain labor saving in the production. In addition, since the surrounding body can inhibit dust generation, this jacket heater is suitable for use in clean rooms or the like.

MODES FOR CARRYING OUT THE INVENTION

The jacket heater according to the present invention is described below.

Figure 1:
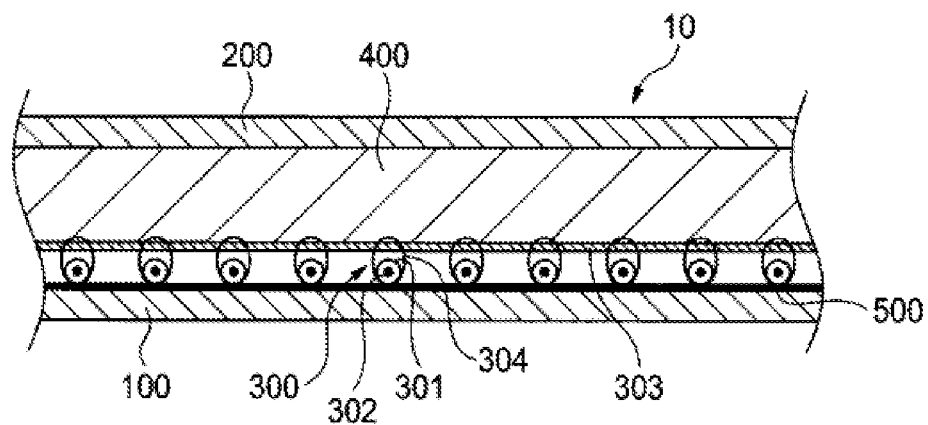
FIG. 1 is a view which illustrates a cross-section of one embodiment of the jacket heater of the present invention.
Figure 5:
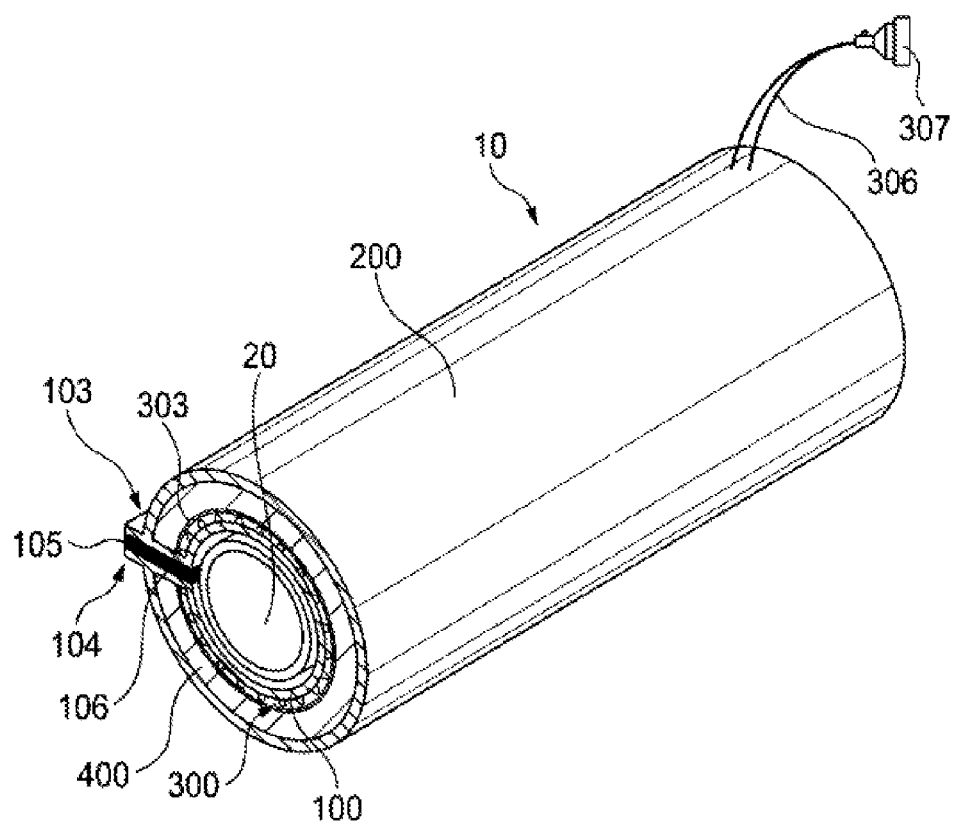
FIG. 5 is a perspective view which illustrates a conventional jacket heater.

A jacket heater 10 according to this embodiment has an overall configuration that is the same as that shown in FIG. 5, in which a heating element 300, which contains a support (sheet made of inorganic fibers) 303 and a heating wire (electric heating wire) 302 attached thereto, and a thermal insulator 400 are superposed with each other and placed between an inner-layer material 100 and an outer-layer material 200 which serve as a surrounding body. However, this jacket heater 10 further contains a metal foil 500 interposed between the heating element 300 and the inner-layer material 100, as shown by the cross-sectional view of FIG. 1.

As the inner-layer material 100 and outer-layer material 200 which constitute a surrounding body, use can be made of a fluororesin sheet which is made of a fluororesin such as polytetrafluoroethylene (PTFE), a tetrafluoroethylene/perfluoroalkoxyethylene copolymer (PFA), a tetrafluoroethylene/hexafluoropropylene copolymer (FEP), polychlorotrifluoroethylene (PCTFE), a tetrafluoroethylene/ethylene copolymer (ETFE), a chlorotrifluoroethylene/ethylene copolymer (ECTFE), or poly(vinylidene fluoride) (PVDF); a fluororesin fiber cloth (woven fabric) obtained by knitting fibers of any of these fluororesins; an inorganic-fiber cloth (woven fabric) formed of inorganic fibers such as glass fibers, silica fibers, alumina fibers, or silica-alumina fibers; a fluororesin-coated inorganic-fiber cloth obtained by subjected such an inorganic-fiber cloth to coating treatment with any of those fluororesins; or the like.

Also usable as the inner-layer material 100 and the outer-layer material 200, besides the above fluororesins, are resins which are heat-resistant but have a lower melting point than the fluororesins, such as polyamides, polycarbonates, polyacetals, poly(butylene terephthalate)s, modified poly(phenylene ether)s, poly(phenylene sulfide)s, polysulfones, polyethersulfones, polyarylates, polyetheretherketones, polyphthalamides, polyimides, polyetherimides, and polymethylterpenes.

The thickness of the surrounding body is not particularly limited so long as the effects of the present invention are obtained. The thickness thereof is desirably 0.1 to 8 mm, preferably 0.1 to 5 mm, and more preferably 0.1 to 2 mm.

The heating element 300 is not particularly limited so long as a watt density thereof is 0.15 W/cm$^2$ or more. For example, use can be made of a heating wire (electric heating wire) 302 which emits heat upon voltage application, such as a nichrome wire or a stainless-steel wire. It is preferred that such an electric heating wire 302 should be electrically insulated. This insulation may be attained by covering the electric heating wire 302 with an inorganic-fiber sleeve made of inorganic fibers such as glass fibers, silica fibers, alumina fibers, or silica-alumina fibers, or by coating the electric heating wire 302 with a resin. Furthermore, a heating element made of carbon or a heating element made of a ceramic may be used in place of the electric heating wire.

In the present invention, the term "watt density", which is also called power density, means the degree of the surface load (W/cm$^2$) of the jacket heater that is expressed in terms of the electrical capacity (W) per unit surface area (cm$^2$) of the jacket heater. In general, larger values of watt density result in elevated heater surface temperatures and, conversely, smaller values of watt density result in lowered heater surface temperatures. There is no particular upper limit on the watt density so long as the watt density is 0.5 W/cm$^2$ or less. Specifically, the watt density may be any value in the range of 0.15 to 0.5 W/cm$^2$, and can be 0.17 to 0.5 W/cm$^2$, 0.20 to 0.5 W/cm$^2$, or 0.25 to 0.5 W/cm$^2$.

The electric heating wire 302 may be sewed to the support 303 with a sewing yarn 304 in accordance with a desired pattern. As this support 303, use can be made, for example, of an inorganic-fiber cloth formed of inorganic fibers such as glass fibers, silica fibers, alumina fibers, or silica-alumina fibers. Since an electric heating wire having a high watt density can be used in the present invention, it is possible to employ an electric heating wire which has an increased diameter and a reduced length. In addition, the interval between adjacent parts of the electric heating wire (hereinafter referred to also as pitch) can be set larger than in conventional technique. Specifically, the pitch has hitherto been about 10 to 35 mm from the standpoint of ensuring even heating. In contrast, according to the configuration of the present invention, the pitch can be, for example, 40 to 70 mm, and preferably 45 to 60 mm.

As the thermal insulator 400, use can be made of an inorganic-fiber mat obtained by gathering glass fibers, ceramic fibers, silica fibers, or the like and subjecting the fibrous mass to needle processing. Alternatively, such fibers may be shaped into a mat shape with an inorganic binder such as colloidal silica, alumina sol, or sodium silicate, or with an organic binder such as starch. It is also possible to use a porous shaped object made of a heat-resistant organic resin such as an aramid, polyamide, or polyimide. The thickness of such a thermal insulator is not particularly limited so long as the effects of the present invention are obtained. The thickness thereof is desirably 5 to 100 mm, preferably 5 to 50 mm, and more preferably 8 to 30 mm.

Besides the materials described above, a fibrous material filled with an aerogel (aerogel-filled fibrous material) can also be used as the thermal insulator. This aerogel-filled fibrous material is a thermal insulator obtained by filling a fibrous base with an aerogel.

As the fibrous base which constitutes the aerogel-filled fibrous material, use can be made of a fibrous base made of, for example, organic fibers such as poly(ethylene terephthalate) (PET) fibers or inorganic fibers such as carbon fibers, glass fibers, aluminosilicate fibers, silica fibers, mullite fibers, or alumina fibers. A fibrous base made of inorganic fibers having excellent heat resistance can be advantageously used.

Namely, a woven or nonwoven fabric of inorganic fibers can be advantageously employed as the fibrous base. As the nonwoven fabric, use can be made, for example, of a papery sheet obtained by forming inorganic fibers by means of a paper-making machine, a blanket obtained by gathering inorganic fibers and subjecting the fibrous mass to needle processing to shape into a mat shape, or a mat such as felt obtained by adding an organic binder to inorganic fibers and shaping into a mat shape. When a nonwoven fabric in which the inorganic fibers have been randomly oriented is used as a fibrous base, an aerogel can be effectively held in the interstices among the inorganic fibers of this fibrous base.

With respect to the inorganic fibers which constitute the fibrous base, for example, when the jacket heater of the present invention is to be used in an environment where the required heat resistance is not so high, e.g., below 100° C., organic fibers capable of imparting excellent flexibility to the aerogel-filled fibrous material, such as PET fibers, can be advantageously used. When the jacket heater of the present invention is to be used, for example, in an environment where some degree of heat resistance, such as 100-250° C., is required, inexpensive glass fibers can be advantageously used. When the jacket heater of the present invention is to be used, for example, in an environment where high heat resistance, such as above 250° C., is required, ceramic fibers having high heat resistance, such as aluminosilicate fibers, silica fibers, mullite fibers, or alumina fibers, can be advantageously used.

As the aerogel, use can be made, for example, of an aerogel formed of an inorganic material (inorganic aerogel) or an aerogel formed of an organic material (organic aerogel). Advantageously usable is an inorganic aerogel having excellent heat resistance. As the inorganic aerogel, use can be made, for example, of a silica aerogel or an alumina aerogel. In particular, when a silica aerogel is used, the thermal insulation properties of the aerogel-filled fibrous material can be effectively enhanced.

Consequently, an aerogel-filled fibrous material obtained by filling a nonwoven fabric of inorganic fibers with an inorganic aerogel can be advantageously used. Specifically, an aerogel-filled fibrous material obtained by filling a nonwoven fabric of ceramic fibers with a silica aerogel or an aerogel-filled fibrous material obtained by filling a glass-fiber mat with a silica aerogel can, for example, be advantageously used. As such an aerogel-filled fibrous material, products including, for example, "SPACELOFT 2200", "SPACE-LOFT 2250", "Pyrogel 6650", and "Pyrogel XT" are available from Aspen Aerogels Inc.

The proportion of the aerogel to be contained in the aerogel-filled fibrous material to the fibrous base can be suitably set in accordance with the properties required of the aerogel-filled fibrous material (e.g., thermal insulation properties, heat resistance, low dust generation, and flexibility). The density of the aerogel-filled fibrous material can be, for example, in the range of 20 to 500 kg/m$^3$, and preferably in the range of 100 to 300 kg/m$^3$.

Convection of air within the aerogel-filled fibrous material is effectively prevented by the action of the microvoids present in the aerogel which fills the interstices among the fibers. This aerogel-filled fibrous material hence has excellent thermal insulation properties.

Specifically, the coefficient of thermal conductivity at 25° C. of the aerogel-filled fibrous material can be set, for example, 0.024 W/m·K or less, preferably 0.020 W/m·K or less, and more preferably 0.018 W/m·K or less.

Furthermore, the coefficient of thermal conductivity at 80° C. of the aerogel-filled fibrous material can be set, for example, 0.035 W/m·K or less, preferably 0.027 W/m·K or less, and more preferably 0.025 W/m·K or less.

Since the aerogel-filled fibrous material has excellent thermal insulation properties as described above, a reduction in thickness can be attained while maintaining sufficient thermal insulation properties. Specifically, the thickness of the aerogel-filled fibrous material can be set, for example, in the range of 1 to 50 mm, preferably in the range of 1 to 25 mm, and more preferably in the range of 1 to 15 mm. A reduction in the thickness of the thermal insulator not only can improve the flexibility of the jacket heater of the present invention, but also enables the jacket heater to have a reduced thickness and can thereby contribute to space saving.

The metal foil 500 is not particularly limited so long as the foil has a high coefficient of thermal conductivity. Although an aluminum foil is suitable because of the inexpensiveness thereof, another metal such as copper or stainless steel can also be employed. With respect to the thickness of the metal foil 500, too small thicknesses may result in foil rupture, while too large thicknesses may result in impaired flexibility and an increased cost. Consequently, the thickness thereof is desirably 20 µm to 5 mm, preferably 30 to 100 µm, and more preferably 40 to 70 µm.

Figure 2:
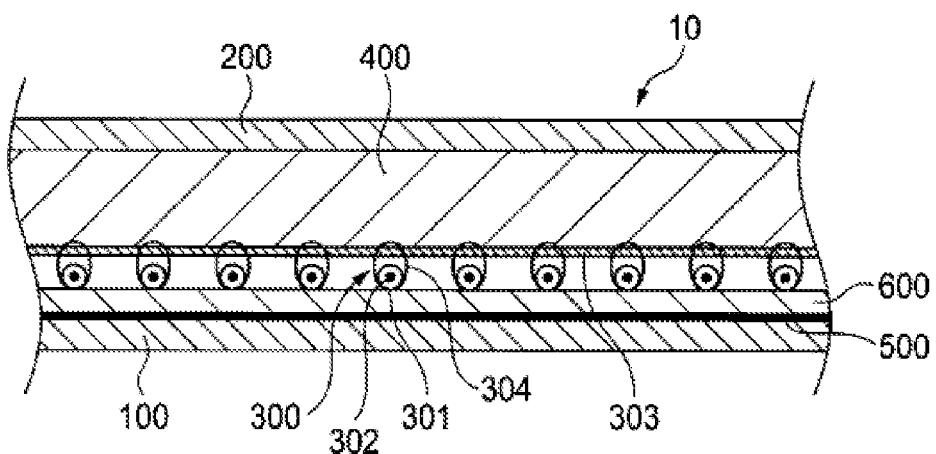
FIG. 2 is a cross-sectional view which illustrates the state shown in FIG. 1 in which a glass cloth has been interposed as an insulating member.

As shown in FIG. 2, an insulating member 600 having electrical insulating properties can be further interposed between the electric heating wire 302, which constitutes the heating element 300, and the metal foil 500. Suitable as the material of the insulating member 600 is, for example, a cloth made of inorganic fibers such as glass fibers, silica fibers, alumina fibers, or silica-alumina fibers. By means of such an insulating member, electrical insulation between the electric heating wire and the metal foil can be ensured without fail.

In the present invention, a structure obtained by integrating a metal foil 500 with an insulating member 600 may be interposed between the heating element and the surrounding body so that the insulating member 600 is located on the heating-element side. Specifically, an aluminum-surfaced cloth, such as one obtained by thermally fusion bonding an aluminum foil to a surface of an inorganic-fiber cloth, one obtained by adhering a film coated with aluminum by vapor deposition to the surface, or one obtained by transferring aluminum to the surface, may be disposed so that the exposed inorganic-fiber cloth is located on the heating-element side. As such an aluminum-surfaced cloth, use can be made, for example, of "Aluminum-Surfaced Cloth", manufactured by Nichias Corp.

The surface temperature of the electric heating wire 301 having a high heating capacity as described above, which constitutes the heating element 300, rises to approximately 500° C. There hence is a possibility that if the heat is directly transferred to that part of the inner-layer material 100 which lies directly under the electric heating wire, the material might deteriorate in an early stage. However, since a metal foil 500 has been interposed, the heat which has transferred to the metal foil diffuses evenly within the metal foil. As a result, direct heat transfer from the electric heating wire to the inner-layer material 100 is inhibited and thermal deterioration can be prevented.

Furthermore, the two peripheral edge parts 103 and 104 of the inner-layer material 100 and outer-layer material 200 are bonded to each other by sewing, thermal fusion bonding, or the like to thereby surround the heating element 300, thermal insulator 400, and metal foil 500, which are in a stacked state, with the inner-layer material 100 and the outer-layer material 200. A structure containing this jacket heater of the present invention and an object to be heated, such as a pipe, has a cross-section in which the outer surface of the pipe, the inner-layer material as part of the surrounding body of the jacket heater of the present invention, the metal foil, the heating element, the thermal insulator, and the outer-layer material as part of the surrounding body have been stacked in this order along the outward radical direction for the pipe. Incidentally, an insulating member may be interposed between the metal foil and the heating element as stated above.

For covering a pipe 20 with the jacket heater 10, as conventional technique, the space between the two peripheral edge parts 103 and 104 is widened, and the jacket heater is mounted on the pipe 20, thereafter, the two peripheral edge parts 103 and 104 are brought into contact with each other and fixed to each other by means of, for example, a hook-and-loop fastener 105 and 106 disposed on the edge surfaces. A known fixing means such as an implement such as hooks or buckles, or belts can be employed in place of the hook-and-loop fastener 105 and 106.

Besides being configured in a cylindrical shape suitable for mounting on a pipe 20 as shown in FIG. 5, the jacket heater 10 can be produced in a curved or L-shaped form as a whole so as to be mounted on a curved or L-shaped pipe. In the case where the object to be heated is in the shape of a square case, the jacket heater 10 can be produced in the shape of a box or plate.

According to the configuration described above, with the jacket heater of the present invention, the maximum surface temperature of an object to be heated (maximum use temperature) can be set at above 250° C. Incidentally, the maximum surface temperature of an object to be heated may be 200 to 250° C. and, in this case, a jacket heater having a high heating rate can be provided.

EXAMPLES

The present invention will be further described below by reference to Example and Comparative Example, but the present invention should not be construed as being limited by the Example in any way.

(Production of Test Samples)

Figure 3:
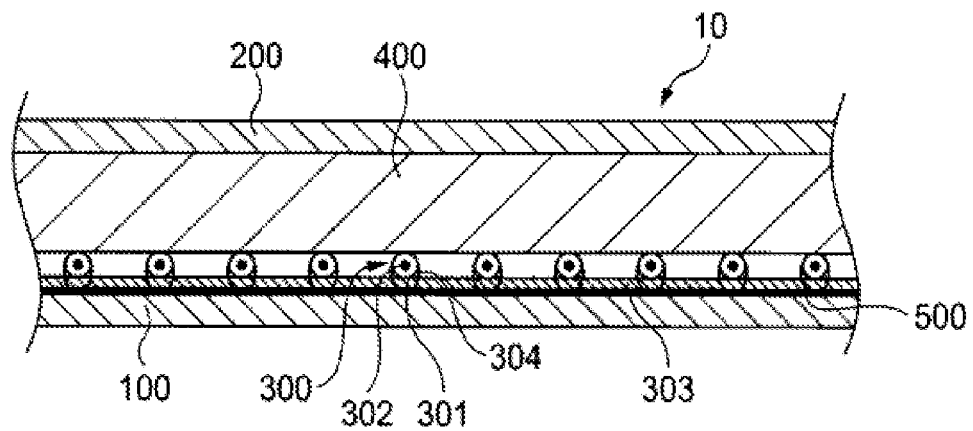
FIG. 3 is a view which illustrates a cross-section of another embodiment of the jacket heater of the present invention.

A nichrome wire inserted into a sleeve made of silica fibers was sewed with a sewing yarn to a surface of a glass cloth (thickness, 0.25 mm) as a support to obtain a heating element. This heating element had a watt density of 0.17 W/cm². An aluminum foil having a thickness of 50 μm was superposed as a metal foil on the glass-cloth side, and a mat made of glass fibers (thickness, 16 mm) was superposed as a thermal insulator on the nichrome wire side. Thus, a stack was produced. Subsequently, this stack was surrounded with a glass-fiber cloth which had been subjected to coating treatment with fluororesin (PTFE) (thickness, 0.25 mm) as a surrounding body, and the ends were bonded to each other to produce sample A, which had the sectional shape shown in FIG. 3. The PTFE with which the glass-fiber cloth had been coated had a melting point of 327° C.

For the purpose of comparison, the same procedure was conducted, except that no aluminum foil was interposed. Thus, sample B was produced.

(Surface Temperature Measurement)

Figure 4:
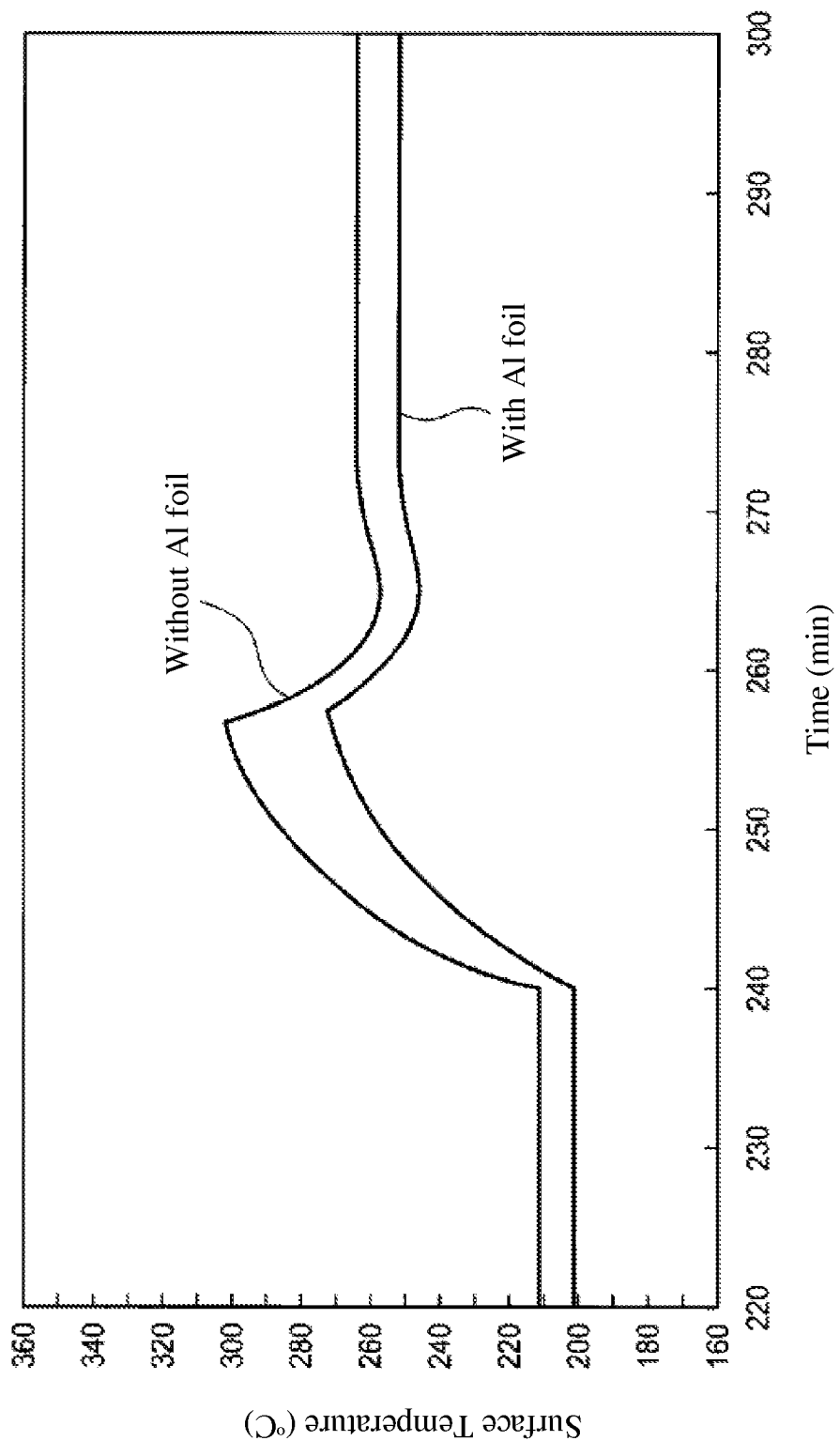
FIG. 4 is graphs which show the results of surface temperature measurements of sample A, which included an interposed aluminum foil, and sample B, which included no aluminum foil interposed, in Example.

A voltage was applied to the nichrome wire of each of samples A and B so that the pipe used as an object to be heated came to have a surface temperature set at 250° C., and the temperature of the surface of the glass-fiber cloth which had been subjected to coating treatment with fluororesin (PTFE), at which the cloth was in contact with the pipe which was located directly under the nichrome wire, was measured. The results thereof are shown in FIG. 4. In sample B, in which no aluminum foil had been interposed, the surface temperature rose to about 300° C. In contrast, in sample A, in which an aluminum foil had been interposed, the surface temperature rose to about 270° C. at the most. Thus, the effect of the interposition of an aluminum foil in accordance with the present invention was ascertained.

While the present invention has been described in detail and with reference to specific embodiments thereof, it will be apparent to one skilled in the art that various changes and modifications can be made therein without departing from the spirit and scope thereof.

This application is based on Japanese Patent Application No. 2010-088006, which was filed on Apr. 6, 2010, the contents thereof being incorporated herein by reference.

REFERENCE SINGS LIST

10 Jacket heater (mantle heater)
100 Inner-layer material
200 Outer-layer material
300 Heating element
400 Thermal insulator
500 Metal foil

The invention claimed is:

1. A jacket heater having a heating element built therein, the jacket heater comprising:
   a metal foil, the metal foil having a thickness of 20 to 100 μm;
   a support disposed adjacently to the metal foil;
   the heating element having a watt density of 0.15 W/cm² or more, the heating element being supported by the support;
   a thermal insulator disposed adjacent to the heating element; and
   a surrounding body which surrounds the metal foil, the support, the heating element, and the thermal insulator,
   wherein the support is formed of a cloth made of inorganic fibers,
   the surrounding body includes an inner-layer material and an outer-layer material,
   the inner-layer material is disposed on the metal foil on a side opposite to the support,
   the outer-layer material is disposed on the thermal insulator on a side opposite to the heating element,
   the surrounding body is configured such that peripheral edge parts of the inner-layer material and the outer-layer material are bonded to each other,
   the inner-layer material and the outer-layer material each have a thickness of 0.1 to 8 mm, and
   the inner-layer material, the metal foil, the support, the heating element, the thermal insulator, and the outer-layer material are stacked in a layered structure and stacked in order from an inner side to an outer side of the jacket heater.

2. The jacket heater according to claim 1, wherein the surrounding body is a sheet made of a fluororesin or a cloth made of inorganic fibers and having been subjected to coating treatment with a fluororesin.

3. The jacket heater according to claim 1, wherein the heating element comprises an electric heating wire.

4. The jacket heater according to claim 1, which is mounted on an object to be heated, so that the inner-layer material of the surrounding body comes into contact with the object.

5. A method for mounting the jacket heater of claim 1 on an object to be heated, wherein the jacket heater is mounted so that the metal-foil-side surface of the surrounding body comes into contact with the object.

6. The jacket heater according to claim 1, wherein the support is in direct contact with the metal foil, and the thermal insulator disposed is in direct contact with the heating element.

7. The jacket heater according to claim 1, wherein the thermal insulator is an aerogel-filled fibrous material obtained by filling a fibrous base with an aerogel.

8. The jacket heater according to claim 1, the thermal insulator is an aerogel-filled fibrous material obtained by filling a fibrous base with an aerogel, and the aerogel-filled fibrous material has a coefficient of thermal conductivity at 25° C. of 0.024 W/m·K or less, and has a coefficient of thermal conductivity at 80° C. of 0.035 W/m·K or less.

9. A jacket heater having a heating element built therein, the jacket heater comprising:
- a thermal insulator;
- a support disposed adjacent to the thermal insulator;
- the heating element having a watt density of 0.15 W/cm$^2$ or more, the heating element being supported by the support;
- an insulating member disposed adjacent to the heating element;
- a metal foil disposed adjacent to the insulating member, the metal foil having a thickness of 20 to 100 μm; and
- a surrounding body which surrounds the thermal insulator, the support, the heating element, the insulating member, and the metal foil,
- the support being formed of a cloth made of inorganic fibers,
- the insulating member being formed of an electrically insulating cloth made of inorganic fibers,
- the surrounding body including an inner-layer material and an outer-layer material,
- the inner-layer material being disposed on the metal foil on a side opposite to the insulating member, and
- the outer-layer material being disposed on the thermal insulator on a side opposite to the support, and wherein the surrounding body is configured such that peripheral edge parts of the inner-layer material and the outer-layer material are bonded to each other,
- the inner-layer material and the outer-layer material each have a thickness of 0.1 to 8 mm, and
- the inner-layer material, the metal foil, the insulating member, the heating element, the support, the thermal insulator, and the outer-layer material are stacked in a layered structure and stacked in order from an inner side to an outer side of the jacket heater.

10. The jacket heater according to claim 9, wherein the surrounding body is a sheet made of a fluororesin or a cloth made of inorganic fibers and having been subjected to coating treatment with a fluororesin.

11. The jacket heater according to claim 9, wherein the heating element comprises an electric heating wire.

12. The jacket heater according to claim 9, which is mounted on an object to be heated, so that the inner-layer material of the surrounding body comes into contact with the object.

13. A method for mounting the jacket heater of claim 9 on an object to be heated, wherein the jacket heater is mounted so that the metal-foil-side surface of the surrounding body comes into contact with the object.

14. The jacket heater according to claim 9, wherein the support is in direct contact with the metal foil, and the thermal insulator disposed is in direct contact with the heating element.

15. The jacket heater according to claim 9, wherein the thermal insulator is an aerogel-filled fibrous material obtained by filling a fibrous base with an aerogel.

16. The jacket heater according to claim 9, the thermal insulator is an aerogel-filled fibrous material obtained by filling a fibrous base with an aerogel, and the aerogel-filled fibrous material has a coefficient of thermal conductivity at 25° C. of 0.024 W/m·K or less, and has a coefficient of thermal conductivity at 80° C. of 0.035 W/m·K or less.

* * * * *